United States Patent
Koerner et al.

(10) Patent No.: US 8,882,074 B2
(45) Date of Patent: Nov. 11, 2014

(54) ADAPTER FOR FASTENING A SUPPORT PROFILE

(75) Inventors: Stefan Koerner, Eschenburg (DE); Markus Neuhof, Ehringshausen-Niederlemp (DE); Paul Root, Bad Endbach (DE)

(73) Assignee: Rittal GmbH & Co. KG, Herborn (DE)

( * ) Notice: Subject to any disclaimer, the term of this patent is extended or adjusted under 35 U.S.C. 154(b) by 63 days.

(21) Appl. No.: 13/261,382

(22) PCT Filed: Dec. 20, 2010

(86) PCT No.: PCT/EP2010/070289
§ 371 (c)(1),
(2), (4) Date: Sep. 12, 2012

(87) PCT Pub. No.: WO2011/091915
PCT Pub. Date: Aug. 4, 2011

(65) Prior Publication Data
US 2013/0015299 A1  Jan. 17, 2013

(30) Foreign Application Priority Data

Jan. 26, 2010 (DE) .......................... 10 2010 000 207

(51) Int. Cl.
*F16M 13/00* (2006.01)
*H02G 3/06* (2006.01)
*F16M 13/02* (2006.01)
*H02G 3/04* (2006.01)
*F16M 11/04* (2006.01)
*F16M 11/06* (2006.01)
*F16M 11/00* (2006.01)

(52) U.S. Cl.
CPC ......... *F16M 11/00* (2013.01); *F16M 2200/065* (2013.01); *H02G 3/0608* (2013.01); *F16M 13/02* (2013.01); *H02G 3/0493* (2013.01); *F16M 2200/08* (2013.01); *F16M 11/04* (2013.01); *F16M 11/06* (2013.01)
USPC .......................... 248/523; 248/346.03; 52/298

(58) Field of Classification Search
CPC ............ E04H 12/2261; E04H 12/2269; E04H 12/2238; E04H 2/2292; E02D 27/42
USPC ......... 248/511, 519, 523, 539, 346.03; 52/98, 52/298, 297
See application file for complete search history.

(56) References Cited

U.S. PATENT DOCUMENTS 1,394,386 A * 10/1921 Abbert ............................ 40/433
3,198,296 A *  8/1965 Pfaff, Jr. et al. ................. 52/298

(Continued)

FOREIGN PATENT DOCUMENTS

| DE | 38 05 425 C1 | 2/1989 |
| DE | 29 615 033 U1 | 1/1998 |
| EP | 0 828 326 B1 | 1/2002 |
| EP | 1 335 462 A2 | 8/2003 |

*Primary Examiner* — Bradley Duckworth
(74) *Attorney, Agent, or Firm* — Marshall & Melhorn, LLC

(57) ABSTRACT

The invention relates to an adapter for fastening a support profile, comprising a profile receptacle having a supporting section, and a fastening side which at least in some areas is spaced from the supporting section, wherein a cable maneuvering compartment is formed between the supporting section and the fastening side and is spatially connected to a feedthrough of the supporting section and at least one cable feedthrough. Using said design, cables coming from a wide variety of directions can be fed to the adapter in a simple and organized manner.

8 Claims, 5 Drawing Sheets

(56) References Cited

U.S. PATENT DOCUMENTS

| | | | |
|---|---|---|---|
| 3,343,322 A * | 9/1967 | Lurkis et al. | 52/298 |
| 3,364,635 A * | 1/1968 | Guggemos | 52/28 |
| RE26,995 E * | 12/1970 | Guggemos | 52/122.1 |
| 3,563,502 A | 2/1971 | Dayson | |
| 3,974,372 A * | 8/1976 | Cochran | 362/431 |
| 4,649,675 A * | 3/1987 | Moldovan et al. | 52/27 |
| 4,793,111 A * | 12/1988 | Shewchuk | 52/298 |
| 4,953,821 A | 9/1990 | Reuter et al. | |
| 5,144,780 A | 9/1992 | Gieling et al. | |
| 5,197,819 A * | 3/1993 | Hughes | 404/13 |
| 5,568,909 A * | 10/1996 | Timko | 248/519 |
| 5,762,311 A * | 6/1998 | Triglia | 248/523 |
| 6,240,689 B1 * | 6/2001 | Haddad et al. | 52/298 |
| 6,327,833 B1 * | 12/2001 | Miskelley et al. | 52/848 |
| 6,328,273 B1 * | 12/2001 | Kemikem | 248/530 |
| 7,219,873 B2 * | 5/2007 | Harwood | 248/519 |
| 7,694,487 B1 * | 4/2010 | Ryan | 52/741.15 |
| 7,765,770 B2 * | 8/2010 | Fournier | 52/843 |
| 7,851,702 B2 * | 12/2010 | Fournier et al. | 174/45 R |
| 7,874,126 B2 * | 1/2011 | Fournier | 52/843 |
| 7,886,492 B2 | 2/2011 | Kelly et al. | |
| 8,011,149 B2 * | 9/2011 | Knudsen | 52/298 |
| 8,042,783 B2 | 10/2011 | Santoro | |
| 8,444,104 B2 * | 5/2013 | Li | 248/523 |
| 2004/0025460 A1 * | 2/2004 | Terrels | 52/298 |
| 2007/0187564 A1 * | 8/2007 | McGuire | 248/346.5 |
| 2013/0069800 A1 * | 3/2013 | Kosedag | 340/928 |
| 2013/0313396 A1 * | 11/2013 | Vetesnik | 248/523 |

* cited by examiner

ADAPTER FOR FASTENING A SUPPORT PROFILE

BACKGROUND OF THE INVENTION

The invention relates to an adapter for fastening a support profile comprising a profile receptacle having a support section and a fastening side which at least in some areas is spaced from the supporting section.

Adapters of this type are used for support arm systems. Support arm systems regularly consist of one or more support profiles and adapter parts. As adapter parts, for example wall/floor attachments are used which may be screwed to a wall or floor surface. A support profile may be inserted into the profile receptacle of the adapter and may be secured therein. Cables on the wall or at the bottom are guided into the interior of the support profile via the adapter. To this end, the support profile comprises a cable duct extending in longitudinal direction. In order to ensure a proper insertion of cables, the cable coming up from the wall or the floor, respectively, is dragged through an opening in the support section. That opening is aligned with the cable duct of the support profile. Now, it may occur often that several cables must be introduced into the support profile via the adapter, however, these cables are not lead out in the same location at the wall or floor, respectively. In this situation, the support profile is laterally opened by means of a milling cutter, so that access to the cable duct of the support profile results. The cable may then be pushed into the opening produced. Since this procedure is elaborate, some times open cable ducts are provided in support profiles. They may be closed by a cover. If now a cable is to be introduced laterally, the cover is broken and the cable is simply pushed into the cable duct of the support profile.

This way of cable installation, however, does not always meet the highest optical requirements.

SUMMARY OF THE INVENTION

It is the object of the invention to provide an adapter of the type mentioned in the introductory via which laterally guided cables may be introduced into the support profile in a simple manner. This object is achieved in that a cable manoeuvring compartment is formed between the supporting section and the fastening side which is spatially connected to a feedthrough of the support section and at least one cable feedthrough.

Cables coming centrally up from the floor or the wall, respectively, may be introduced directly into the support profile in a known manner via the feedthrough. If now an additional cable is to be introduced laterally, this is simply possible via the additional cable feedthrough which also leads into the cable manoeuvring compartment. In the cable manoeuvring compartment, the cable may then be dragged into the cable duct of the support profile together with the cable coming up from the floor or the wall, respectively. Thus, a proper introduction of a laterally guided cable may be realized by the adapter in optically appealing manner.

According to a preferred variant of the invention it may be provided that two cable feedthroughs lead into the cable manoeuvring compartment at opposite sides or that four cable feedthroughs lead into the cable manoeuvring compartment at pairwise opposing sides. Thereby, flexibility of the adapter is further increased.

An adapter according to the invention may be characterized in that the cable feedthrough or the cable feedthroughs, respectively, are closed by means of closure pieces which are molded thereto and can be broken away therefrom.

The user may now, depending on his individual installation situation, decide which cable feedthroughs he may use. He must then merely break out the relevant closure piece to access the cable manoeuvring compartment. He may keep the remaining cable feedthroughs closed, to that tightness is maintained in that region.

According to the invention it may be provided that the cable manoeuvring compartment can be accessed via the cable feedthroughs in a direction transverse to the fastening plane defined by the fastening side, so that laterally feeding through cables is made possible without any problems. Hereby, it is in particular advantageous that the cable feedthroughs are open towards the fastening side. Then, cables already installed when mounting the adapter may be inserted laterally into the cable feedthroughs.

Stable fastening and unique alignment of the support profile connected to the adapter is made possible in that on a side of the support section facing away from the cable manoeuvring compartment a profile receptacle is formed which is delimited by support surfaces for engaging the outer geometry of a support profile to be inserted into the profile receptacle.

A particularly preferred embodiment of the invention is such that a further cable feedthrough is provided on a side of the support section facing away from the cable manoeuvring compartment. A subsequent cable installation is possible via this cable feedthrough when an adapter is already installed. In this case, the cable is dragged through the further cable feedthrough and is introduced into the support profile via the outside surface of the support profile. Hereby, it turns out to be in particular advantageous that the support profile comprises a laterally open cable duct which is directly aligned with the further cable feedthrough. Thus, in particular no final machining must be performed at the support profile. If it is further provided that the base part comprises a tap extending in the region of the further cable feedthrough, that the tab comprises one or more openings leading into the fastening side and that the cable feedthrough and the openings can be closed by a common lid, both the fastening assembly for fastening the adapter to a wall or a floor and the further cable feedthrough are optically shielded with the aid of a single lid.

Herein, it may be in particular provided that the tab comprises an integrally molded wall forming, together with the lid, a spatial enclosure to the environment. In this way, a simple construction results and additionally a stable construction which is in particular suited for deployment in rough industrial operation.

BRIEF DESCRIPTION OF THE DRAWINGS

The invention will be explained in detail below with the aid of an exemplary embodiment illustrated in the drawings. It is shown in.

DETAILED DESCRIPTION OF THE INVENTION

Figure 1:
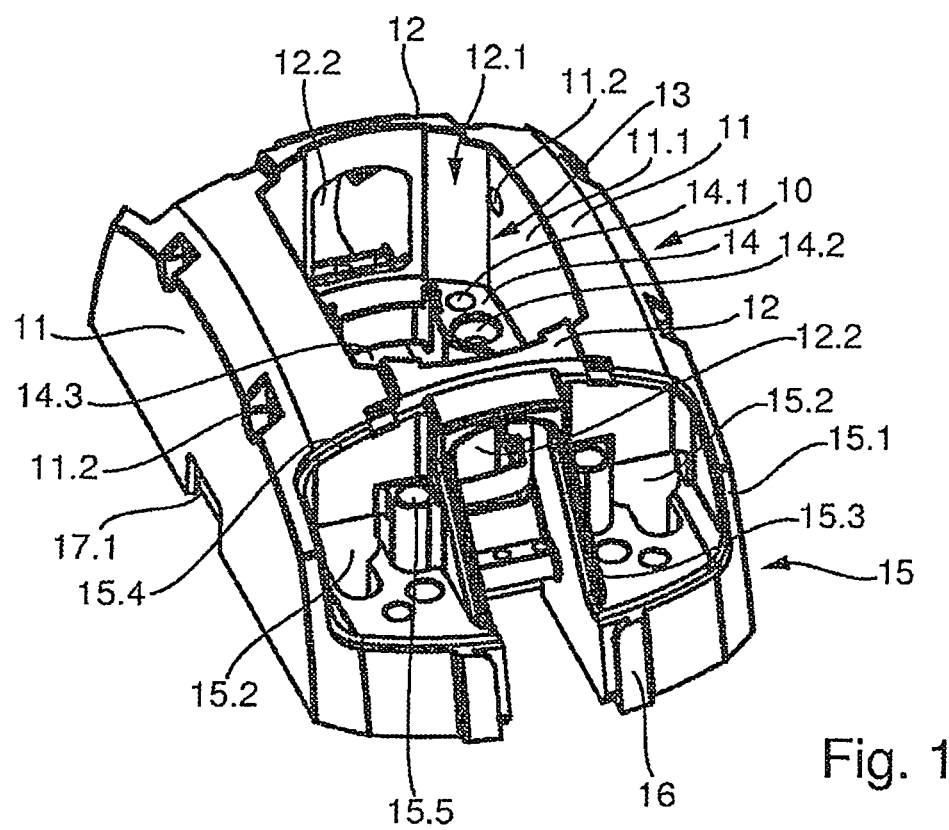
FIG. 1 an adapter in a perspective side view.

FIG. 1 shows an adapter, in particular a wall/floor attachment for a support arm system. The adapter comprises a basis part 10 surrounding, together with side walls 11 and 12, a profile receptacle 13. Side walls 11 and 12 form support surfaces 11.1 or 12.1, respectively, facing to profile receptacle 13. At the bottom, profile receptacle 13 is delimited by a support section 14 which in the region of the two opposing side walls 11 respectively forms support surfaces. Both support surfaces lie in a common plane and serve to support the flat end side of a support profile 30, as explained in detail below.

Through bores as fastening receptacles 14.1 are machined into support section 14. Further, support section 14 comprises adjusting receptacles 14.2. Support section 14 is broken by an opening 14.3. Opening 14.3 gives access to a cable manoeuvring compartment 17. Cable manoeuvring compartment 17 is more clearly shown in FIG. 3. As illustrated in this representation, cable manoeuvring compartment 17 is in spatial connection with profile receptacle 13 via feedthrough 14.3. Cable manoeuvring compartment 17 terminates in the region of the bottom side of the adapter in a fastening side 18. Fastening side 18 is plan parallel to the support surface for support profile 30 formed by support section 14.

Figure 3:
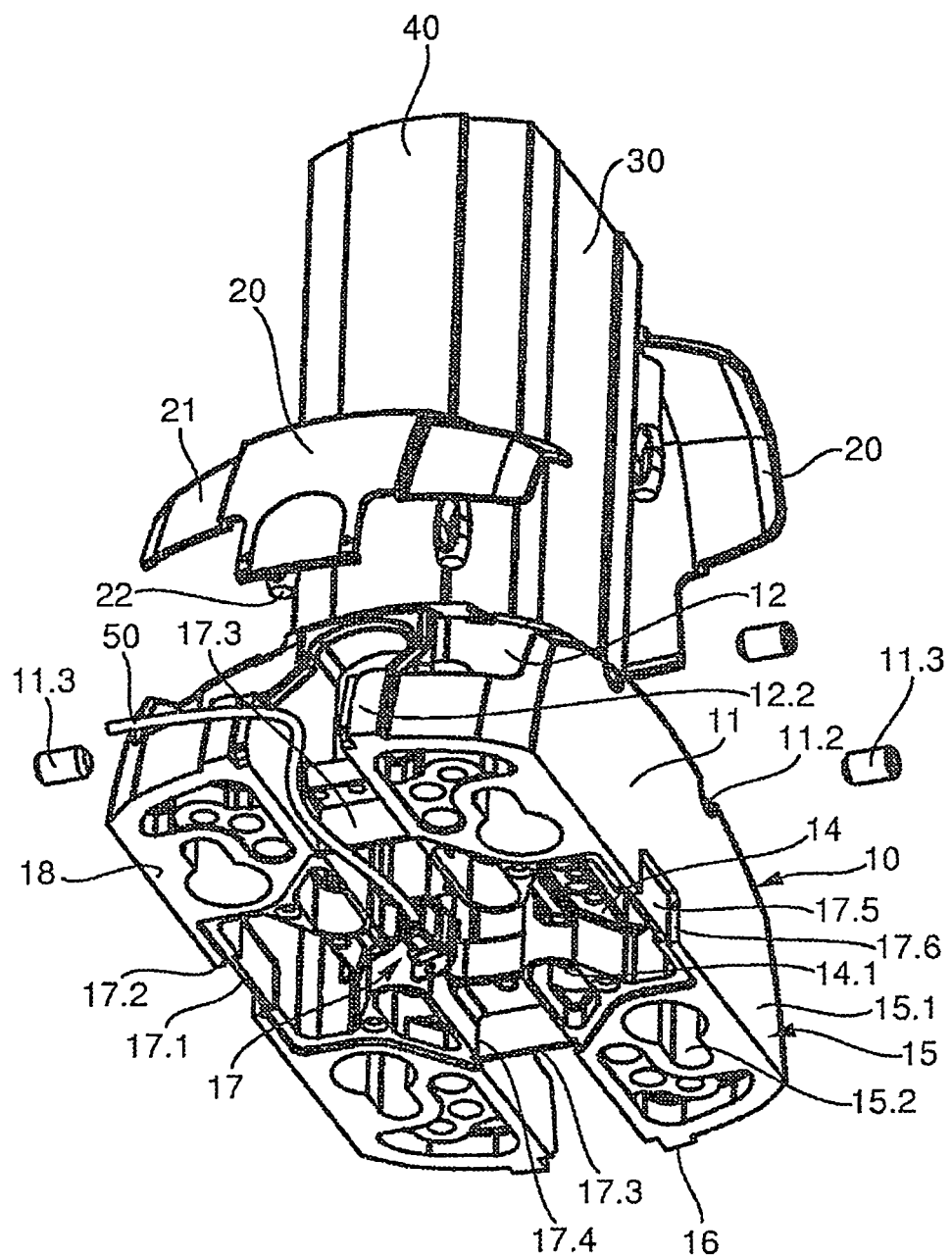
FIG. 3 the adapter of FIG. 1 in a perspective view from the bottom and in combination with the support profile of FIG. 2.

Cable manoeuvring compartment 17 is open towards the bottom side of the adapter, i.e. through the fastening side 18. Thus, a cable 15 coming up from the connected floor or wall, respectively, may be immediately introduced into the cable manoeuvring compartment 17, dragged through feedthrough 14.3 and brought into the region of the profile receptacle 13. Furthermore, the adapter comprises closure pieces 17.1, 17.3, 17.5 at pairwise opposing sides which can be broken out. They are attached to the adapter via predetermined breaking points such that they may be broken away easily with the aid of a tool, for example a screw driver. Closure pieces 17.1, 17.3, 17.5 broken away result in cable feedthroughs 17.2, 17.4, 17.6. As illustrated in FIG. 3, cables 50 may be laterally introduced via these cable feedthroughs 17.2, 17.4, 17.6. Cable feedthroughs 17.2, 17.4, 176 are open towards fastening side 18, so that cables 50 ready-made with plugs may be brought easily into the region of the cable manoeuvring compartment 17. Due to the generously dimensioned feedthrough 14.3, the plugs of these cables may also conveniently be pushed through and brought into the region of profile receptacle 13.

It may further be recognized in FIG. 1 that in addition to cable feedthroughs 17.2, 17.4, 17.6 further cable feedthroughs 12.2 are provided in the region of side walls 12. These further cable feedthroughs 12.2 provide a spatial connection between the environment and the profile receptacle 13. Further cable feedthroughs 12.2 are arranged in the region of tabs 15 laterally protruding beyond side walls 12. Tabs 15 comprise plate shaped sections which are provided with keyhole like openings 15.2. Tabs 15 are laterally equipped with walls 15.1 which optically appealing merge into the outer surfaces of side walls 12. Furthermore, tab 15 comprises respectively two clamping receptacles 15.5 serving to fix a lid 20. The design of lid 20 is better seen in FIG. 3. As shown in this illustration, lid 20 comprises two lateral tabs 21, respectively bearing a pin-shaped clamping element 22 having spring elements molded thereto. Clamping elements 22 may be pushed into an associated clamping receptacle 15.5 such that they clamp in a press fit with their spring elements. Having mounted lid 20, it rests on a rim 15.4 of tab 15 with its rim-shaped dimensional border and abuts thereto. In the middle region of tab 15 two parallel delimiting walls 15.3 delimit further cable feedthrough 12.2. Lid 20 is further supported on the free ends of these delimiting walls 15.3 so that a secure fastening of lid 20 is achieved.

Figure 2:
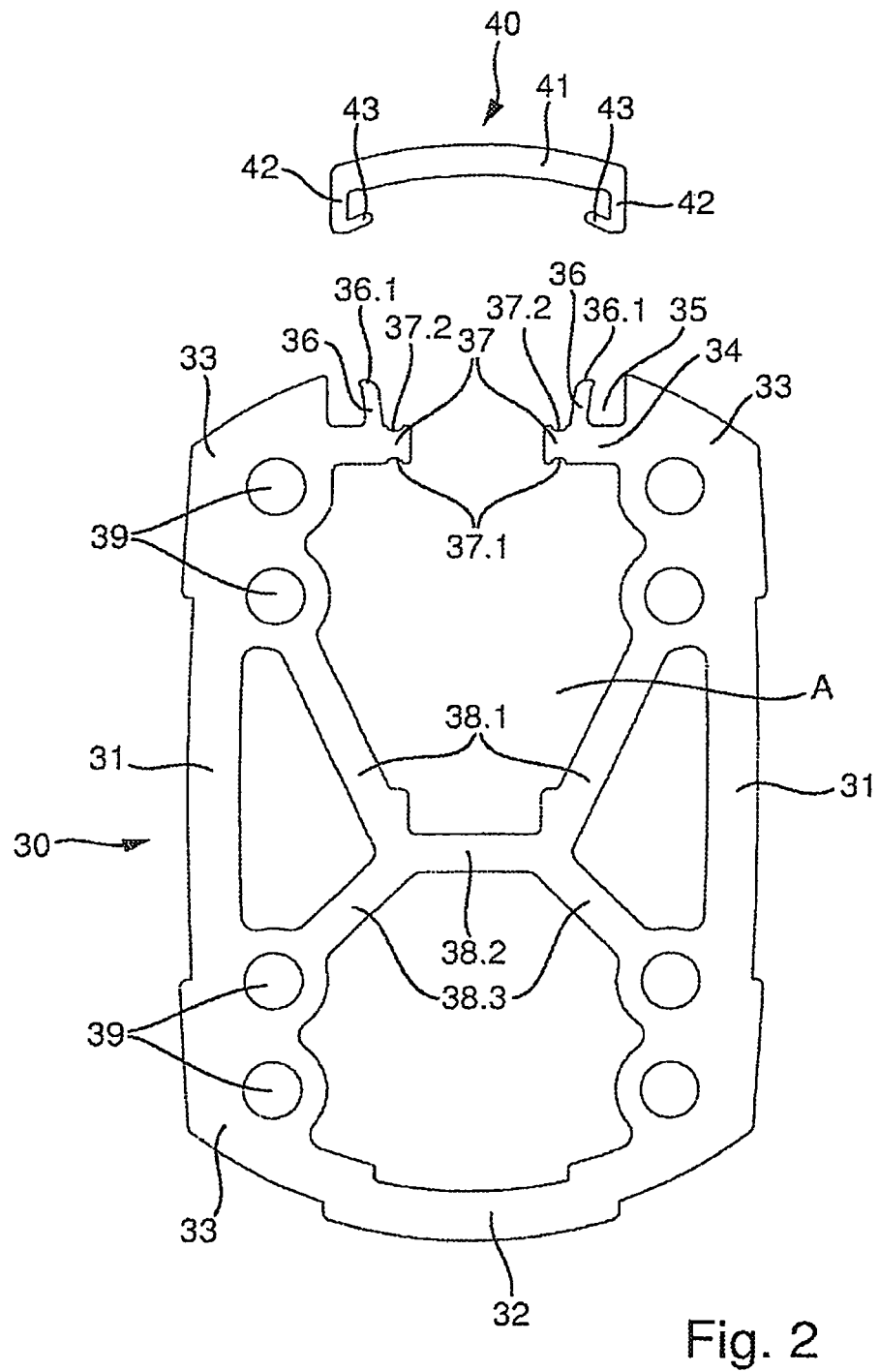
FIG. 2 an end view of a support profile.

In FIG. 2 a support profile 30 in the form of an extruded aluminium profile is shown. Support profile 30 comprises two parallel side walls 31 terminating at their longitudinal ends in corner pieces 33. Two lower corner pieces 33 are integrally connected via a transition piece 32. Two upper corner pieces 33 respectively bear a tab 37 which is formed bar-like and delimits an insert opening in longitudinal direction of the profile. Two indentations 37.1 and 37.2 in the form grooves are machined into both tabs 37. Indentations 37.1 and 37.2 extend in longitudinal direction of the profile. Tab 37 further carries an upwardly protruding counter latching element 36, to which end a latching protrusion 36.1 is molded. Counter latching element 36 together with a wall of corner piece 30 delimits a groove 35. As already mentioned previously, two tabs 37 delimit an insert opening via which a receiving space A can be accessed. Receiving space A is enclosed by the two upper corner pieces 33 of tabs 37 and by delimiting bars 38.1. Delimiting bars 38.1 respectively connect integrally to upper corner pieces 33 and extend at an angle inwardly to the profile center. Delimiting bars 38.1 are molded to a connecting element 38.2 at the end facing away from corner pieces 33. Facing away from receiving space A, connecting element 38.2 carries two further connecting bars 38.3. These are in turn integrally molded to the two lower corner pieces 33 and extend also at an angle. A star-shaphed stiffening structure is created by delimiting elements 38.1 and 38.3 and connecting element 38.2 which considerably increases stiffness of support profile 30.

Corner pieces 33 are respectively equipped with two integrally formed screw channels 39 extending continuously in longitudinal direction of the profile. The adapter may be screwed to these screw channels 39 with the aid of connecting screws. To this end, support profile 30 is pushed into profile receptacle 13 until the end of support profile 30 rests on the support surface of support section 14. Subsequently, fastening screws are introduced into fastening receptacle 14.1 from the bottom side of the adapter through the fastening side 18 and screwed into the associated screw channels 39 of support profile 30. Support profile 30 is accordingly screwed to the outer four screw channels 39 illustrated in FIG. 2. Inner screw channels 39 may be used for adjusting support profile 30 with respect to the adapter. To this end, screws may be screwed into these screw channels 39. Screw channels 39 posses lenticular screw heads which may be accommodated within the indentations of the adjusting receptacles 14.2 (see FIG. 1). Adjusting receptacles 14.2 comprise through bores which allow access to the lenticular head of the screw through the fastening side 18 by means of a tool. If now the screw is rotated with the aid of the tool, the end side of the support profile 30 may be easily tilted with respect to the support surfaces of support section 14, so that angular adjustment of support profile 30 is made possible.

Figure 4:
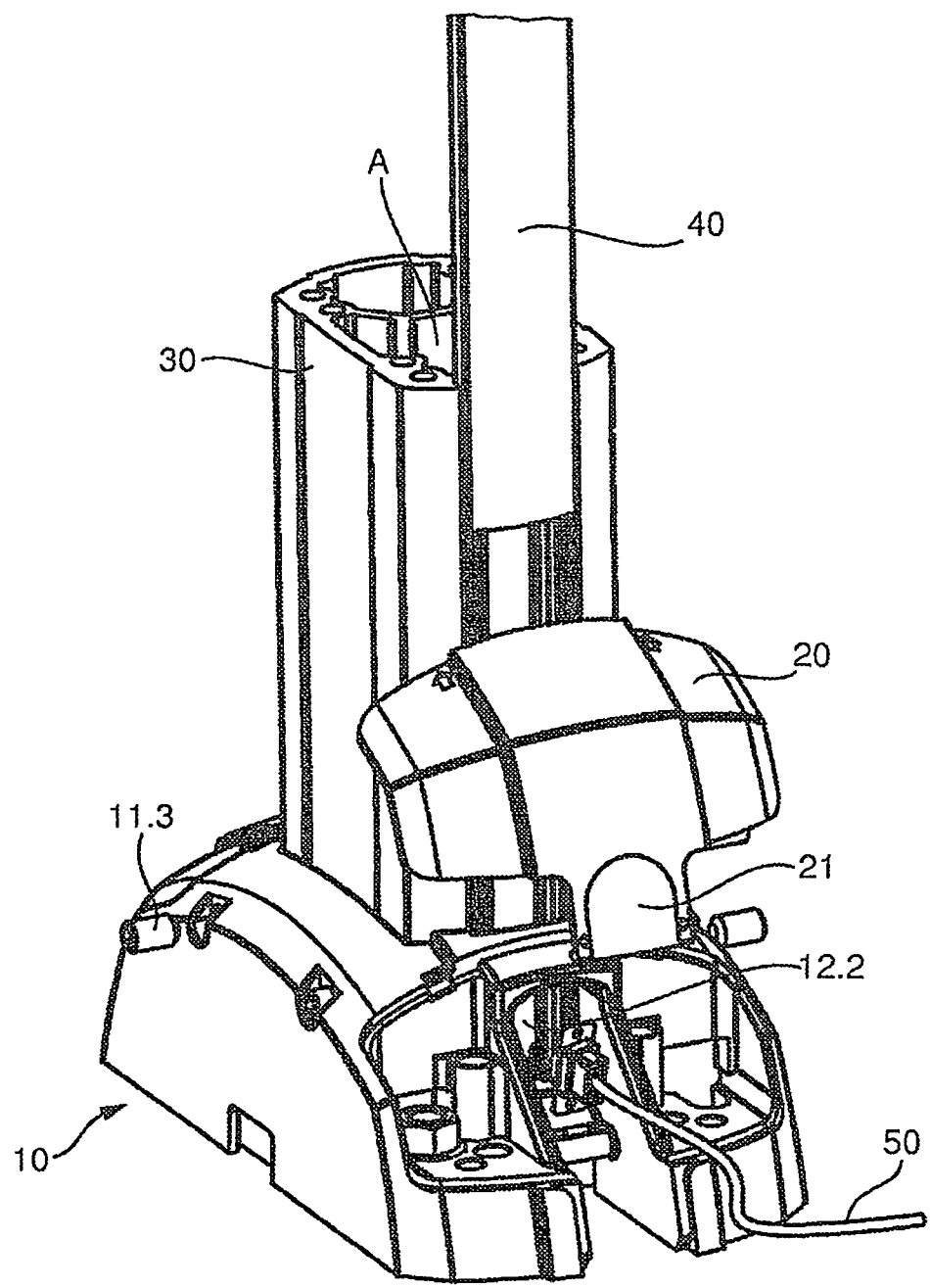
FIG. 4 the physical unit of FIG. 3 in a perspective side view.
Figure 5:
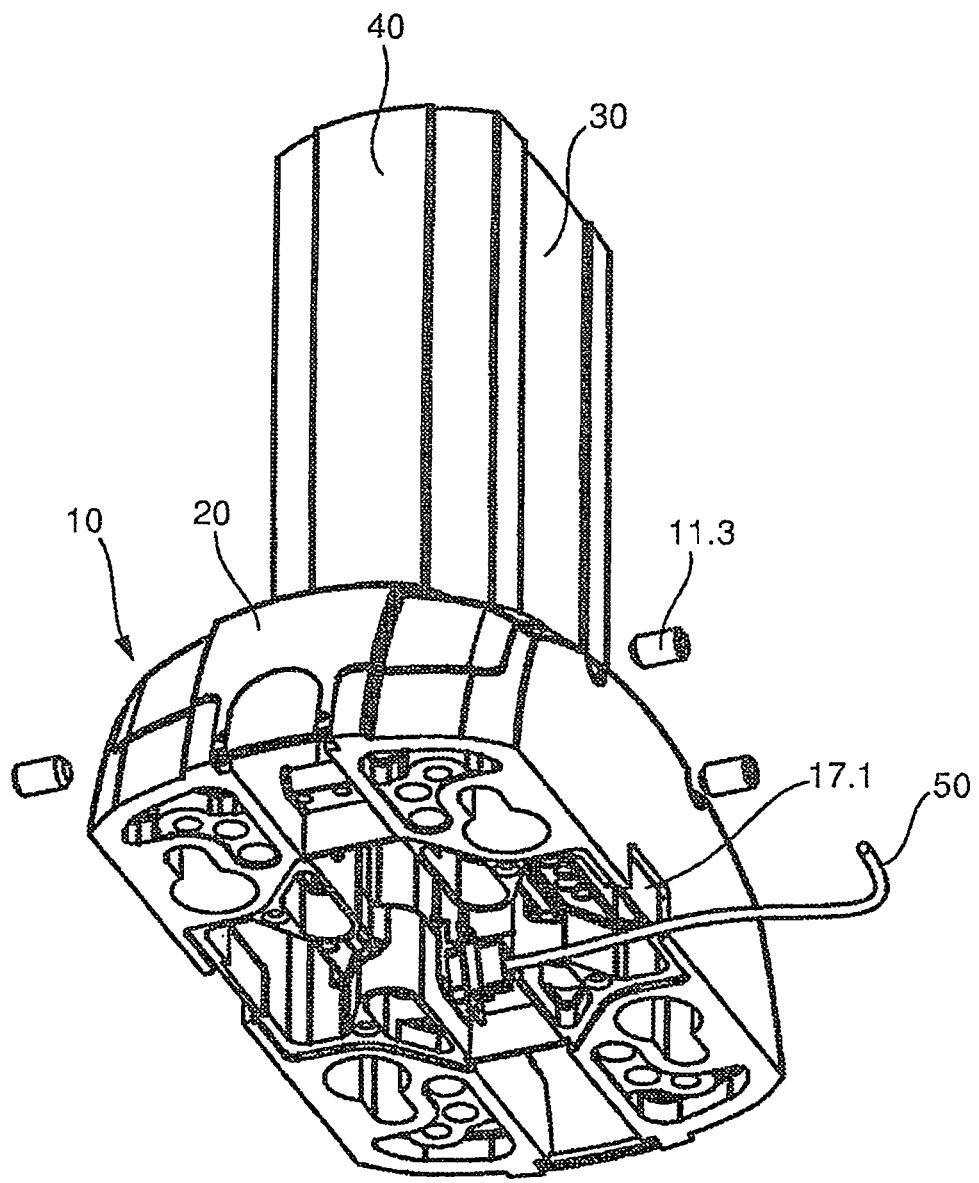
FIG. 5 the physical unit of FIG. 3 or 4, respectively, in a perspective view from the bottom.

In a mounted state, support profile 30 is supported by support surfaces 11.1 and 11.2 at its outer contour. For a tightening free of play, threaded receptacles 11.2 lead into profile receptacle 13 which may accessed from the outer side of side walls 13. Accordingly, threaded bolts 11.3 (see FIG. 3) may be screwed through threaded receptacles 11.2 until they abut at the outer contour of support profile 30 and are tightened against it. In the mounted state, as illustrated in FIG. 4, support profile 30 with receiving space A is aligned with respectively associated further cable feedthrough 12.2. Thus, a cable 50 may be pushed through further cable feedthrough 12.2 and introduced into receiving space A of support profile 30. Since cable feedthrough 12.2 is generously dimensioned, cables 50 ready-made with plug elements may be guided therethrough. In this way, a subsequent installation of cables is easily possible for an already installed adapter unit. To this end, cable 50 is pushed through the insert region formed by the both tabs 37 of support profile 30 into receiving space A. The insert opening formed between tabs 37 may be covered by means of a cover 40. Cover 40 is formed with a plastic molded part and comprises a convex blind 41 to which the two downwardly protruding tabs 42 are integrally molded. Tabs 42 are parallel and spaced. The free ends of tabs 42 terminate in latch elements 43. For mounting cover 40 it is set onto the support profile 30 such that tabs 42 immerse into grooves 35 of support profile 30. Thereby, latching elements 43 are diverted outwardly at counter latching element 36 until they snap behind latching protrusion 36.1. Convex blind 41 merges into connecting surfaces of corner pieces 33, so that a harmonical closure is created which corresponds to the closure formed on the opposite side by means of transition piece 32.

The invention claimed is:

1. An adapter for fastening a support profile comprising a profile receptacle having a support section, and a fastening side which at least in some areas is spaced from the support section, wherein a cable maneuvering compartment is formed between the support section and the fastening side which is spatially connected to a feedthrough of the support section and at least one cable feedthrough, wherein a further cable feedthrough is provided through a side wall of the adapter on a side of the support section facing away from the cable maneuvering compartment, the further cable feedthrough providing a spatial connection between the environment and the profile receptacle and wherein a base part of the adapter comprises a tab extending in the region of the further cable feedthrough and laterally protruding beyond the side wall, the tab comprises one or more openings leading into the fastening side, and the cable feedthrough and the openings can be closed by a common lid.

2. The adapter of claim 1, wherein two cable feedthroughs lead into the cable maneuvering compartment at opposite sides.

3. The adapter of claim 2, wherein the cable feedthroughs lead into the cable maneuvering compartment at two pairs of opposing sides.

4. The adapter of claim 1, wherein the cable feedthrough or the cable feedthroughs, respectively, are closed by means of closure pieces which are molded thereto and can be broken away therefrom.

5. The adapter of claim 1, wherein the cable maneuvering compartment can be accessed via the cable feedthroughs in a direction transverse to the fastening plane defined by the fastening side.

6. The adapter of claim 1, wherein the cable feedthrough is open towards the fastening side.

7. The adapter of claim 1, wherein on a side of the support section facing away from the cable maneuvering compartment, the profile receptacle is formed and is delimited by support surfaces for engaging the outer geometry of a support profile to be inserted into the profile receptacle.

8. The adapter of claim 1, wherein the tab comprises an integrally molded wall that, together with the lid, closes the profile receptacle off from the environment.

* * * * *